US005704970A

United States Patent [19]

Kawaguchi et al.

[11] Patent Number: 5,704,970

[45] Date of Patent: Jan. 6, 1998

[54] WATER-PREVENTING SEALANT WITH PLASTICITY

[75] Inventors: Yuji Kawaguchi, Matsudo; Tomonori Nagaoka, Sagae; Takeshi Nakamura, Musashino; Hiroshi Kikuchi, Iwaki, all of Japan

[73] Assignee: Kunimine Industries Co., Ltd., Tokyo, Japan

[21] Appl. No.: 568,548

[22] Filed: Dec. 7, 1995

[30] Foreign Application Priority Data

Dec. 8, 1994 [JP] Japan .................................... 6-330467

[51] Int. Cl.$^{6}$ ................................ C10N 40/34; E04B 1/66

[52] U.S. Cl. ................................................................ 106/33

[58] Field of Search ................................ 106/33; 252/35, 252/25, 32, 39, 38

[56] References Cited

U.S. PATENT DOCUMENTS 4,209,568 6/1980 Clem .................................... 405/258
4,279,547 7/1981 Clem .................................... 428/454
4,756,851 7/1988 Billigmeier et al. ...................... 252/39
5,116,413 5/1992 Nooren .................................... 106/33
5,358,662 10/1994 Brauer .................................... 252/37.7

*Primary Examiner*—Melissa Bonner
*Attorney, Agent, or Firm*—Birch, Stewart, Kolasch & Birch, LLP

[57] ABSTRACT

There is disclosed a water-preventing sealant with plasticity, comprising 10 to 60% by weight of a gelled base oil (i) obtained by conducting a gelling reaction of a mixture of 100 parts by weight of an oil, 10 to 100 parts by weight of a fatty acid and a metal hydroxide or oxide contained in an amount sufficient to convert the fatty acid into a metal salt, and 40 to 90% by weight of at least one member (ii) selected from the group consisting of natural and synthetic water-swellable clay minerals. This sealant has excellent water-preventing performance, stability in lapse of time and self-sealing properties, is excellent in heat stability, and has clayey plasticity to ensure high work-efficiency, and also has water-swelling properties suitable for use in water-preventing work and so on.

17 Claims, 1 Drawing Sheet

WATER-PREVENTING SEALANT WITH PLASTICITY

FIELD OF THE INVENTION

The present invention relates to a water-preventing sealant with plasticity. More particularly, the present invention relates to a water-preventing sealant with plasticity which is not only excellent in water-preventing performance, stability in lapse of time and self-sealing properties but is also provided with heat stability, and which has so-called clayey plasticity to thereby ensure high work-efficiency, and which also has water-swelling properties suitable for use in water-preventing work and repair.

BACKGROUND OF THE INVENTION

Hitherto, asphalt, rubber and resin sealants have been employed for the water cut-off at concrete joints or other various joint portions that are formed at civil engineering and building subsurface construction sites, to thereby prevent water leakage at such points of contact. Further, cement and smectite sealants have also been used as other water cut-off materials. A bentonite sealant having the property of swelling by absorbing water is known as an example of the smectite sealants. For example, bentonite in powdery or granular form is either applied as it is. Alternately bentonite in powdery or granular form is interposed between, for example, corrugated boards or nonwoven fabric, to form a water-preventing panel or sheet before use. However, any of these conventional sealants has been unable to attain both of an excellent applicability and a retention of water stopping effect for a prolonged period of time.

The conventional organic water-preventing sealants, namely, the asphalt, rubber and resin sealants have water cut-off capabilities, which are deteriorated with the passage of time, for example, by hardening due to changes of the ambient temperature or by decomposition due to the action of bacteria present in the soil. Therefore, in the conventional sealants, there is a material problem in the retention of the initial water stopping effect. With respect to water-preventing sealants which must be cured after the application, a given period of time is required for a complete drying after the application thereof, so that the influence of weather at the time of application or after the application becomes a problem, to bring about various constraints on the execution of work. Further, none of the asphalt, rubber, resin and cement sealants has self-sealing properties.

On the other hand, the smectite water-preventing sealant composed of powdery or granular bentonite not only is excellent in water-preventing properties and long-term stability but also swells by absorbing water to thereby have self-sealing properties. However, it has a drawback in that its applicability is poor. Further, a water-preventing sealant containing bentonite in which a gelling agent is used to render it putty-like form, has been proposed (JP-A ("JP-A" means unexamined published Japanese patent application) No. 42291/1980 (U.S. Pat. Nos. 4,209,568 and 4,279,547)). However, this liquefies or, if not liquefied, its consistency extremely increases at temperature as low as about 100° C. to attest to its poor heat stability.

SUMMARY OF THE INVENTION

The object of the present invention is to provide a water-preventing sealant which not only has high water-preventing capability, long-term stability and self-sealing properties but also is excellent in heat stability, and which has clayey plasticity and enables reversible shaping to thereby have excellent applicability.

Other and further objects, features, and advantages of the invention will appear more evident from the following description taken in connection with the accompanying drawing.

DETAILED DESCRIPTION OF THE INVENTION

Figure 1:
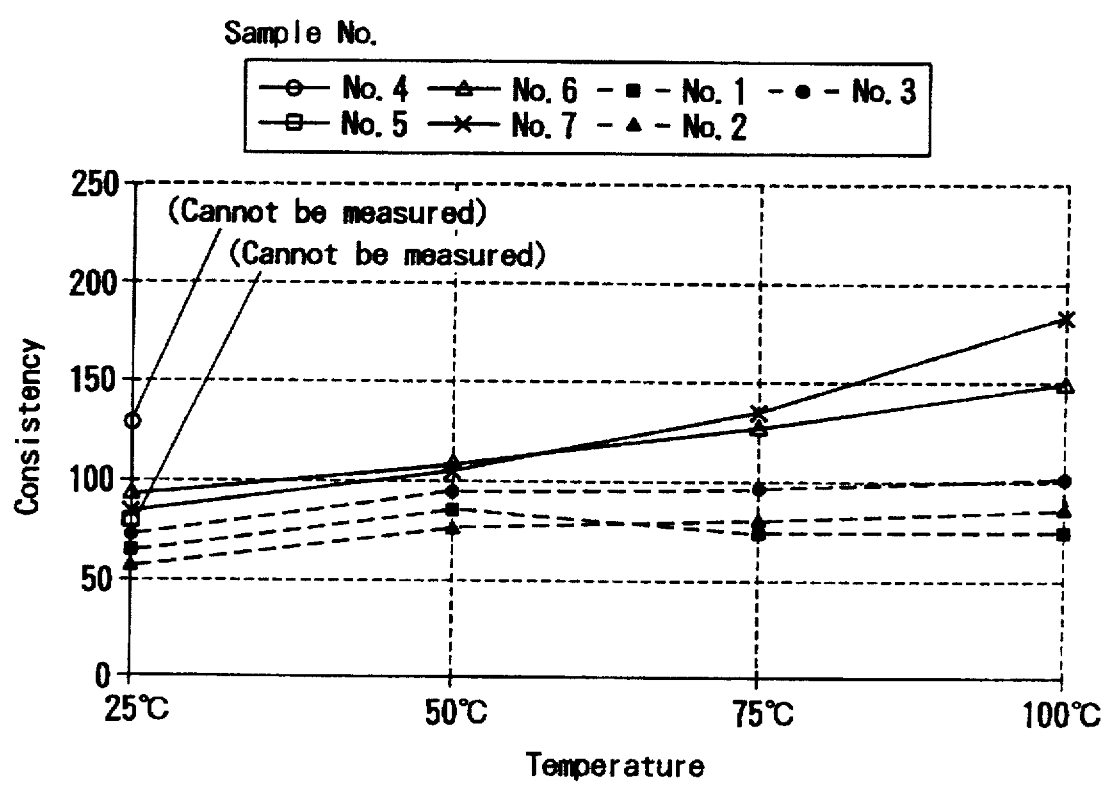
FIG. 1 is a graph showing the change of consistency due to changes of temperature with respect to the water-preventing sealant of the present invention, which also shows those in samples of the Comparative Examples.

The inventors have made various studies in view of the above problems. As a result, we have found that a water-preventing sealant, which not only has high water-preventing capability, long-term stability and self-sealing properties but also is excellent in heat stability, can be obtained by blending 10 to 60% by weight of a gelled base oil (reaction gel), which is obtained by reacting a given amount of a fatty acid with an approximately equivalent amount of a metal hydroxide or oxide in an oil and gelling the resultant reaction product, with 40 to 90% by weight of a water-swellable clay. Further, the inventors have found that the thus obtained water-preventing sealant is putty-like; it enables reversible shaping .into a desired form; it can easily maintain its shape; and it also has excellent applicability. The present invention has been completed on the basis of the above findings.

Therefore, the present invention provides:

(1) a water-preventing sealant with plasticity, comprising 10 to 60% by weight of a gelled base oil (i) obtained by conducting a gelling reaction Of a mixture of 100 parts by weight of an oil, 10 to 100 parts by weight of a fatty acid and a metal hydroxide or oxide contained in an amount sufficient to convert the fatty acid into a metal salt, and 40 to 90% by weight of at least one member (ii) selected from the group consisting of natural and synthetic water-swellable clay minerals;

(2) The water-preventing sealant as stated in the above (1), wherein the oil is a mineral oil;

(3) The water-preventing sealant as stated in the above (1), wherein the fatty acid is a higher fatty acid;

(4) The water-preventing sealant as stated in the above (3), wherein the fatty acid is lauric, stearic, palmitic, oleic or ricinolic acid;

(5) The water-preventing sealant as stated in the above (1), wherein the metal hydroxide is calcium hydroxide;

(6) The water-preventing sealant as stated in the above (1), wherein the water-swellable clay mineral is at least one member selected from the group consisting of smectite clays and swellable mica;

(7) The water-preventing sealant as stated in the above (6), wherein the water-swellable clay mineral is bentonite;

(8) A composite water-preventing sealant, comprising a plastic water-preventing sealant having water absorption properties and heat stability whose surface is coated with a coating of a water-soluble substance; and (9) The composite water-preventing sealant as stated in the above (8), wherein said plastic water-preventing sealant is the water-preventing sealant with plasticity stated in the above (1).

The present invention will be described in detail below.

In the water-preventing sealant of the present invention, use is made of at least one clay selected from the group consisting of natural and synthetic, water-swellable clay minerals. This clay may be one unmodified or having been modified to render the same lipophilic, and it is preferably at least one member selected from the group consisting of smectite clays, such as bentonite and hectorite, and swellable mica. Of these, bentonite is an especially preferred clay mineral because it is a natural inorganic clay so as to be excellent in safety and free from decomposition by the action of microorganisms present in the soil to thereby be able to retain its water-preventing effect for a prolonged period of time. In the water-preventing sealant of the present invention, one member selected from the group consisting of the above clay minerals is used individually or at least two members selected from the group are used in combination. This clay is contained in the water-preventing sealant of the present invention in an amount of 40 to 90%, preferably 50 to 80% and more preferably 60 to 75% by weight. The use of the clay renders the water-preventing sealant hydrophilic.

The water-preventing sealant of the present invention is obtained by blending the above clay with a gelled base oil in a given proportion. This gelled base oil is a composition obtained by providing an oil, a fatty acid and a metal hydroxide or oxide, and reacting the fatty acid with an alkaline earth metal hydroxide or oxide to thereby effect gelation.

The oil to be employed is at least one selected from the group consisting of mineral oils, natural and synthetic aromatic hydrocarbon oils and natural and synthetic aliphatic hydrocarbon oils. Of these, mineral oils are preferred. For example, aromatic mineral oils can be mentioned as preferred examples thereof. The mineral oils are resistant to decomposition by the action of microorganisms, so that the addition of a mineral oil can impart long-term stability to the water-preventing sealant.

Any of various conventional fatty acids can be used as the above fatty acid, higher fatty acids such as unsaturated or saturated fatty acids each having about 10 to 40 carbon atoms per molecule are preferred. Examples thereof include lauric, stearic, palmitic oleic and ricinolic acids. Saturated fatty acids each having about 10 to 30 carbon atoms per molecule are still preferred, and lauric, stearic and palmitic acids are particularly preferred.

In the present invention, a metal (preferably an alkaline earth metal) hydroxide or oxide is added together with the above fatty acid to an oil to cause a reaction with the fatty acid, so that a gelled base oil can be obtained. This reaction is generally conducted by heating. Although the reaction temperature is not particularly limited, it is preferably 70° C. or higher and still preferably 90° C. or higher. The reaction time is also not particularly limited as long as the gelatin is satisfactorily advanced.

Calcium hydroxide, magnesium hydroxide, aluminum hydroxide, calcium oxide, magnesium oxide, and aluminum oxide can be mentioned as examples of the metal hydroxides and oxides for use in the present invention. Of these, calcium hydroxide and aluminum hydroxide are preferred and calcium hydroxide is especially preferred.

The above gelled base oil is put in the water-preventing sealant of the present invention in an amount of 10 to 60%, preferably 20 to 50% and still preferably 25 to 40% by weight.

In the gelled base oil, the fatty acid is used in an amount of generally 10 to 100 parts, preferably 25 to 80 parts and still preferably 40 to 65 parts by weight relative to 100 parts by weight of the oil. The amount of the metal hydroxide or oxide to be used is not particularly limited as long as it is sufficient to convert the above fatty acid into a metal salt. Although generally the metal hydroxide or oxide is used in an amount stoichiometric to that of the fatty acid, one of the fatty acid and the metal hydroxide or oxide may be used in slight excess of the other. For example, the metal hydroxide or oxide is used in an amount of 0.5 to 2 equivalents, preferably 0.8 to 1.5 equivalents in terms of the metal relative to the fatty acid. The water-preventing sealant of the present invention has its lipophilicity provided by the oil and has its plasticity provided by the fatty acid and the metal hydroxide or oxide.

The water-preventing sealant of the present invention is obtained as a putty-like material having what is known as clayey plasticity, by kneading the gelled base oil with the clay. Thus, this water-preventing sealant can easily be shaped into a desired form at the time of application and it is easy to retain its shape, so that the workability of the water-preventing sealant is excellent.

When the water-preventing sealant of the present invention is used at concrete joints, other various joint portions and points of repair, it not only inhibits the infiltration of water but also absorbs water to thereby swell. However, it is prevented by virtue of the presence of the oil in the water-preventing sealant that the clay, such as bentonite, absorbs an excess of water to thereby cause a water impermeable layer of clay to flow out. Therefore, the concrete joints, other various joint portions and points of repair can be completely cut off from water for a prolonged period of time by the water permeation blocking layer formed of the water-preventing sealant of the present invention which has been continuously applied to the periphery thereof. Further, the water-preventing sealant of the present invention is excellent in heat stability.

Further, the present invention makes it possible to provide a coating of a water-soluble substance on the surface of the plastic water-preventing sealant so that the plastic water-preventing sealant may be made into a composite water-preventing sealant. This composite water-preventing sealant can be formed into an easily handleable shape without damaging the plasticity of the water-preventing sealant. Further, this composide sealant acts as a water-preventing sealant excellent in that, when such water-preventing sealants are only wetted with water, they can be bonded to each other or to the base material where the water-preventing sealant is required for cutting-off water.

The plastic water-preventing sealant of the present invention can be molded into a suitable shape in conformity with the configuration of the place where water-preventing is required, or for the convenience of the handling, the transportation, or the like, then a coating of a water-soluble substance can be formed on the surface of the thus molded plastic water-preventing sealant to make the above composite water-preventing sealant. The size and the shape of such a composite water-preventing sealant are not particularly restricted and an easily handleable shape, such as a prism and a cylinder, can be appropriately selected.

As the water-soluble substance, a natural water-soluble polymer, a synthetic water-soluble polymer, a semisynthetic water-soluble polymer, and the like can be used, such as a hydroxypropyl cellulose, a hydroxypropyl methyl cellulose, a carboxymethylcellulose, a carboxymethylethylcellulose, a methyl cellulose, a cellulose acetate phthalate, a hydroxypropyl methyl cellulose phthalate, quar gum, locust bean gum, gelatin, xanthan gum, agar, starch, a polyvinyl alcohol, a polyvinyl acetal, diethylaminoacetate, a methacrylic acid/methyl methacrylate copolymer, sodium alginate, a sodium polyacrylate, a sodium acrylate/sodium methacrylate copolymer, a sodium acrylate/sodium maleate copolymer, a vinyl acetate/sodium maleic anhydride copolymer, a polyethylene oxide, and a polyacrylamide-type polymer, with preference given to a polyvinyl alcohol, a methyl cellulose, and a polyvinyl acetal.

The coating of the water-soluble substance can be formed by coating the surface of the plastic water-preventing sealant with a film of the water-soluble substance, or applying a solution of the water-soluble substance to the surface of the plastic water-preventing sealant and then drying the solution. It may be enough that the thickness of the coating is such that the inside plasticity is not impaired, that when the coating is brought in contact with water, the water-soluble coating is dissolved and the inside plastic water-preventing sealant absorbs water and swells, that the surface does not become sticky, and that the composite water-preventing sealant has a shape that is easily handled. Generally the thickness is 5 to 100 μm, and preferably 20 to 50 μm. Preferably the plastic water-preventing sealant of the present invention is coated with a polyvinyl alcohol film having a thickness of 10 to 80 μm, and particularly preferably 20 to 45 μm.

In spite of a plastic water-preventing sealant, the above composite water-preventing sealant is free from stickiness of the surface when it is transported or applied because the surface of the plastic water-preventing sealant is coated with a water-soluble substance. After the application, if the water-preventing sealant comes in contact with leaked water, the water-soluble coating is dissolved, the inside water-preventing sealant absorbs the leaked water and swells to exhibit a high water-cutting-off performance. At the time of application, when the place where water stopping is required is only wetted with water, the water-preventing sealant can be bonded firmly to that place because of the coating of the water-soluble substance. Further, if the water-preventing sealant is applied to a wide area, the water-preventing sealants are wetted with water to be bonded to each other and then are pressed by a roller if necessary, so that the water-preventing sealants can be simply and completely bonded together to be integrated.

The water-preventing sealant of the present invention is in putty-like form, so that it can be formed into any shape fit for a particular point of use and can be applied to any place or configuration requiring water cut-off, thereby ensuring excellent workability at the use in site. Further, the water-preventing sealant of the present invention is excellent in heat stability and thus can maintain its plasticity and hardness even at relatively high temperatures, so that excellent application stability in site under varied temperature conditions can be ensured. Still further, the water-preventing sealant of the present invention is putty-like, so that, even if it is directly handled by the hands, it does not stick to the hands and fingers, thereby having excellent workability and application properties. Still further, each of the components is stable over a prolonged period of time, so that semipermanent water cut-off properties can be anticipated. Moreover, the water-preventing sealant has self-sealing properties such that, once it is used in repair and mending, such as filing of wall holes, it absorbs water and swells with the result that the swollen water-preventing sealant hermetically seals the holes to thereby completely prevent water leakage. Therefore, even if cracks occur after the application as a result of the drying or solidifying made with the passage of time, the water-preventing sealant can reversibly swell by reabsorption of water, to block the cracks with the result that water-preventing effect is exerted.

The present invention will now be described in detail with reference to the following examples. However, the invention is not limited to the examples.

EXAMPLE

The consistency and water permeability coefficient were measured by the following methods.

Consistency

The immiscible liquation consistency of each water-preventing sealant was measured by the grease consistency testing method according to JIS K2220 (1993). The measuring temperatures are as shown in Table 1.

Water permeability coefficient

The water permeability coefficient of each water-preventing sealant was measured by the constant water level water permeation test in accordance with the method described in "Dositsu-shiken no Hoho to Kaisetsu (Soil Testing Method & Explanation)" edited by Soil Testing Method (3rd Revision) Editorial Committee and published by Soil Engineering Society in 1991.

Example 1

100 parts by weight of mineral oil, 50 parts by weight of lauric acid and 9.2 parts by weight of slaked lime ($Ca(OH)_2$, equivalent in terms of Ca to the lauric acid) were mixed together and heated to 90° C., thereby obtaining a gelled base oil 1. 35 parts by weight of this base oil 1 and 65 parts by weight of bentonite were kneaded together, thereby obtaining a putty-like material which was designated Sample 1. The consistency, water permeability coefficient and density of the thus obtained Sample 1 were measured. The water permeability coefficient was $3.1\times10^{-9}$ and the density 1.57 g/cm$^3$.

The measuring result of consistency is given in Table 1.

Example 2

100 parts by weight of mineral oil, 50 parts by weight of stearic acid and 4.6 parts by weight of aluminum hydroxide ($Al(OH)_3$, equivalent in terms of Al to the stearic acid) were mixed together and heated to 90° C., thereby obtaining a gelled base oil 2. 35 parts by weight of this base oil 2 and 65 parts by weight of bentonite were milled together, thereby obtaining a putty-like material which was designated Sample 2.

Example 3

100 parts by weight of mineral oil, 50 parts by weight of palmitic acid and 7.2 parts by weight of slaked lime (equivalent in terms of Ca to the palmitic acid) were mixed together and heated to 90° C., thereby obtaining a gelled base oil 3. 35 parts by weight of this base oil 3 and 65 parts by weight of bentonite were kneaded together, thereby obtaining a putty-like material which was designated Sample 3.

Comparative Example 1

25 parts by weight of paraffin wax was added to 75 parts by weight of warm mineral oil (93.3° C.) and vigorously agitated, thereby obtaining a gelled base oil 4. 33 parts by weight of this base oil 4 and 67 parts by weight of bentonite were mixed together, thereby obtaining a putty-like material which was designated Sample 4.

Comparative Example 2

50 parts by weight of paraffin wax was added to 50 parts by weight of warm mineral oil (79.4° C.) and vigorously agitated, thereby obtaining a gelled base oil 5. 47 parts by weight of this base oil 5 and 53 parts by weight of bentonite were mixed together, thereby obtaining a putty-like material which was designated Sample 5.

Comparative Example 3

50 parts by weight of calcium stearate was added to 100 parts by weight of mineral oil, thereby obtaining a gelled base oil 6. 30 parts by weight of this base oil 6 and 70 parts by weight of bentonite were mixed together, thereby obtaining a putty-like material which was designated Sample 6.

Comparative Example 4

50 parts by weight of aluminum stearate was added to 100 parts by weight of mineral oil, thereby obtaining a gelled base oil 7. 30 parts by weight of this base oil 7 and 70 parts by weight of bentonite were mixed together, thereby obtaining a putty-like material which was designated Sample 7.

The consistency of each of the above Samples 2 to 7 was measured in the same manner according to that in the Sample 1.

The results are also given in Table 1.

Further, the change of consistency due to temperatures is shown in FIG. 1 with respect to each of the Samples 1 to 3 and 4 to 7 obtained in the above Examples and Comparative Examples, respectively.

cause water absorption. Then, the swelling cell was pushed against a part of a pile of 10 filter papers for 5 sec, thereafter relocated and again pushed against another part of the pile for 5 sec to thereby remove any excess water. This operation was repeated for 1 min. Immediately upon completion thereof, the weight of the cell, i.e., the weight $W_1$ (g) after water absorption of the empty swelling cell was measured.

Subsequently, 10 g of the Sample 1 was weighed out and uniformly spread on the filter paper of the swelling cell. Water absorption was effected in the same manner as above for varied periods of 1, 3, 18 and 24 hr. Thereafter, any excess water was removed, and immediately the weight $W_2$ (g) after water absorption of the sample-containing swelling cell was measured.

The above measurement were both carried out at 25° C. The degree of swelling (g/g) was calculated from the above measured $W_2$ (g) and $W_1$ (g) according to the formula given below. In the formula, S represents the weight of picked sample and M the water content (%) of the sample.

TABLE 2

(Change of the degree of swelling of tested sample with the passage of time)

| Time passed (hr) | 1 | 3 | 18 | 24 |
|---|---|---|---|---|
| Degree of swelling (g/g) | 1.88 | 2.61 | 4.29 | 4.44 |

$$\text{degree of swelling (g/g)} = \frac{W_2 - W_1}{S \times \frac{100 - M}{100}} - 1$$

As apparent from the results of Table 1 and FIG. 1, increase of consistency by heating was strikingly slight with respect to the water-preventing sealant (Samples 1 to 3) according to the present invention. Thus, the water-preventing sealant of the present invention was obtained in

TABLE 1

| Sample No. | Base oil (pts. wt.) | Bentonite (pts. wt.) | Consistency 25° C. | 50° C. | 75° C. | 100° C. | Remark |
|---|---|---|---|---|---|---|---|
| 1 | base oil 1 35 | 65 | 67 | 86 | 75 | 76 | This Invention |
| 2 | base oil 2 35 | 65 | 59 | 78 | 62 | 88 | This Invention |
| 3 | base oil 3 35 | 65 | 73 | 95 | 97 | 102 | This Invention |
| 4 | base oil 4 33 | 67 | 127 | —[1] | — | — | Comparative Example |
| 5 | base oil 5 47 | 53 | 66 | — | — | — | Comparative Example |
| & | base oil 6 30 | 70 | 93 | 108 | 128 | 150 | Comparative Example |
| 7 | base oil 7 30 | 70 | 85 | 105 | 135 | 184 | Comparative Example |

Note) [1]"—" indicates that the consistency of the sample cannot be measured because of sample's liquefaction.

The change of the degree of welling with the passage of time caused by water absorption was measured in Sample 1 by the following method. The results are given in Table 2.

Degree of swelling (weight method)

Advantec hard filter 4A was attached to one end of a polyvinyl chloride ring (8 cm in diameter and 3 cm in height) and secured with rubber bands (hereinafter referred to as "swelling cell"). A grindstone was used as a water-permeable plate. The grindstone was placed with its blade side up on the bottom of a water vessel, and the water vessel was filled with distilled water up to 2 mm below the blade side of the grindstone. The swelling cell was placed on the water-permeable plate in a manner such that the filter paper contacted the water-permeable plate. The water vessel was closed with a cover and allowed to stand still for 30 min to the form of a freely shapable putty-like material having excellent heat stability.

In contrast, the consistency sharply increased by heating to thereby suffer from liquefaction in Compuserve Examples 1 and 2 (Samples 4 and 5) in which the base oil was gelled with paraffin wax. Moreover, increase of consistency by heating was intense in Comparative Examples 3 and 4 (Samples 6 and 7) in which the base oil was gelled with the metal salt of fatty, acid to thereby demonstrate poor heat stability as compared with that of the water-preventing sealant of the present invention.

Furthermore, the water permeability coefficient of the water-preventing sealant of the present invention was not greater than $1.0 \times 10^{-8}$, thereby showing desired water impermeable properties. In addition, the density of the water-preventing sealant was high and the degree of swelling increased with the passage of time, thereby showing properties suitable for use as a water-preventing sealant.

The water-preventing sealant obtained by the present invention is required to keep the plasticity for a long period of time when it absorbs water. Accordingly, instead of making an oil component gelled by adding a so-called metal soap to the oil component, it is required to use a gelled base oil prepared by forming a metal soap from a fatty acid and a metal compound (a hydroxide, or an oxide) in an oil component "in situ" and causing the oil component to be gelled at the same time. In this way, in the present invention, the plastic water-preventing sealant is made excellent not only in water-preventing performance but also in physical properties, such as heat stability and stability to aging. The reason why the plastic water-preventing sealant exhibits such excellent physical properties has not been known in detail, yet. However, it is assumed that the in situ formation of a metal soap takes place in association with the oil component as well as the fatty acid to result in a gelled base oil made of a reaction gel having an extremely stable gel structure and excellent in affinity for water-swellable clay minerals.

Having described our invention as related to the present embodiments, it is our intention that the invention not be limited by any of the details of the description, unless otherwise specified, but rather be construed broadly within its spirit and scope as set out in the accompanying claims.

What we claim is:

1. A heat stable water-preventing sealant with plasticity, comprising 20 to 50% by weight of a gelled base oil (i) obtained by conducting a gelling reaction of a mixture of 100 parts by weight of an oil, 10 to 100 parts by weight of a fatty acid and a metal hydroxide or oxide contained in an amount sufficient to convert the fatty acid into a metal salt, and 50 to 80% by weight of at least one member (ii) selected from the group consisting of natural and synthetic water-swellable clay minerals, and wherein said sealant has clayey plasticity.

2. The water-preventing sealant with plasticity as claimed in claim 1, wherein the oil is a mineral oil.

3. The water-preventing sealant with plasticity as claimed in claim 1, wherein the fatty acid is a higher fatty acid.

4. The water-preventing sealant with plasticity as claimed in claim 3, wherein the fatty acid is lauric, stearic, palmitic, oleic or ricinolic acid.

5. The water-preventing sealant with plasticity as claimed in claim 1, wherein the metal hydroxide is calcium hydroxide.

6. The water-preventing sealant with plasticity as claimed in claim 1, wherein the water-swellable clay mineral is at least one member selected from the group consisting of smectite clays and swellable mica.

7. The water-preventing sealant with plasticity as claimed in claim 6, wherein the water-swellable clay mineral is bentonite.

8. A composite water-preventing sealant, comprising a water-preventing sealant with plasticity having water absorption properties and heat stability whose surface is coated with a coating of a synthetic, a semisynthetic or a natural water-soluble polymer wherein said water-preventing sealant with plasticity comprises 20 to 50% by weight of a gelled base oil (i) obtained by conducting a gelling reaction of a mixture of 100 parts by weight of an oil, 10 to 100 parts by weight of a fatty acid and a metal hydroxide or oxide contained in an amount sufficient to convert the fatty acid into a metal salt, and 50 to 80% by weight of at least one member (ii) selected from the group consisting of natural and synthetic water-swellable clay minerals.

9. The water-preventing sealant with plasticity as claimed in claim 1, wherein said sealant comprises 60 to 75% by weight of said at least one member (ii) selected from the group consisting of natural and synthetic water-swellable clay materials.

10. The water-preventing sealant with plasticity as claimed in claim 1, wherein said gelled base oil is present in an amount of 25 to 40% by weight.

11. The water-preventing sealant with plasticity as claimed in claim 1, wherein in the gelled base oil, said fatty acid is present in an amount of 25 to 80 parts by weight based on 100 parts by weight of the oil.

12. The water-preventing sealant with plasticity as claimed in claim 1, wherein in the gelled base oil, said fatty acid is present in an amount of 40 to 65 parts by weight based on 100 parts by weight of the oil.

13. The composite water-preventing sealant as claimed in claim 8, wherein the synthetic, semisynthetic or natural water-soluble polymer is selected from the group consisting of a hydroxypropyl cellulose, a hydroxypropyl methyl cellulose, a carboxymethylcellulose, a carboxymethylethylcellulose, a methyl cellulose, a cellulose acetate phthalate, a hydroxypropyl methyl cellulose phthalate, quar gum, locust bean gum, gelatin, xanthan gum, agar, starch, a polyvinyl alcohol, a polyvinyl acetal, diethylaminoacetate, a methacrylic acid/methyl methacrylate copolymer, sodium alginate, a sodium polyacrylate, a sodium acrylate/sodium methacrylate copolymer, a sodium acrylate/sodium maleate copolymer, a vinyl acetate/sodium maleic anhydride copolymer, a polyethylene oxide, and a polyacrylamide polymer.

14. A composite of claim 8, wherein said surface is coated by coating said surface with a film of said water soluble polymer.

15. A composite of claim 8, wherein said surface is coated by applying a solution of the water-soluble polymer to the surface of the water-preventing sealant and then drying the solution.

16. A composite of claim 13, wherein said surface is coated by coating said surface with a film of said water soluble polymer.

17. A composite of claim 13, wherein said surface is coated by applying a solution of the water-soluble polymer to the surface of the water-preventing sealant and then drying the solution.

* * * * *